(12) United States Patent
Bhandari et al.

(10) Patent No.: US 11,104,253 B2
(45) Date of Patent: Aug. 31, 2021

(54) FLEXIBLE HEAT EXCHANGER FOR THERMAL CONTROL OF SEATING SURFACES

(71) Applicant: PADMINI VNA MECHATRONICS PVT. LTD., Haryana (IN)

(72) Inventors: Kabir Bhandari, Gurgaon (IN); Radu Gogoana, San Francisco, CA (US)

(*) Notice: Subject to any disclaimer, the term of this patent is extended or adjusted under 35 U.S.C. 154(b) by 0 days.

(21) Appl. No.: 16/963,960

(22) PCT Filed: Jan. 22, 2019

(86) PCT No.: PCT/IB2019/050523
§ 371 (c)(1),
(2) Date: Jul. 22, 2020

(87) PCT Pub. No.: WO2019/142170
PCT Pub. Date: Jul. 25, 2019

(65) Prior Publication Data
US 2021/0039529 A1    Feb. 11, 2021

(30) Foreign Application Priority Data
Jan. 22, 2018   (IN) .............................. 201811002463

(51) Int. Cl.
*B60N 2/56*    (2006.01)
*B60N 2/70*    (2006.01)

(52) U.S. Cl.
CPC ......... *B60N 2/5642* (2013.01); *B60N 2/5657* (2013.01); *B60N 2/5685* (2013.01)

(58) Field of Classification Search
CPC .. B60N 2/5657; B60N 2/5628; B60N 2/5642; B60N 2/5685
See application file for complete search history.

(56) References Cited

U.S. PATENT DOCUMENTS

| | | | | |
|---|---|---|---|---|
| 5,002,336 A | * | 3/1991 | Feher | A47C 7/744 297/180.13 |
| 5,597,200 A | * | 1/1997 | Gregory | A47C 7/74 297/180.13 |
| 5,715,695 A | * | 2/1998 | Lord | B60H 1/00285 297/180.1 |
| 5,902,014 A | * | 5/1999 | Dinkel | B60N 2/5635 297/452.43 |
| 6,059,018 A | * | 5/2000 | Yoshinori | B60H 1/00285 165/41 |
| 6,230,501 B1 | * | 5/2001 | Bailey, Sr. | A43B 1/0054 62/51.1 |
| 6,254,179 B1 | * | 7/2001 | Kortum | B60H 1/00285 297/180.12 |
| 7,152,412 B2 | * | 12/2006 | Harvie | A41D 13/0051 62/3.5 |

(Continued)

Primary Examiner — Shin H Kim (57) ABSTRACT

The present invention comprises a flexible heat exchange assembly for heating and thermal control the surface of a seat that is designed to prevent the blockage of fluid flow due to the pressure of an occupant's weight, which generally consists of formed layers that create passages through which a heat exchange fluid flows. The upper surface seat cushioning material is formed such that there are recesses into which these fluid passages rest, thereby preventing the blockage of fluid flow when the pressure from the weight of an occupant deforms the cushion.

10 Claims, 8 Drawing Sheets

(56) References Cited

U.S. PATENT DOCUMENTS

| | | | | |
|---|---|---|---|---|
| 7,478,869 | B2* | 1/2009 | Lazanja | B60N 2/5635 297/180.13 |
| 7,828,050 | B2* | 11/2010 | Esaki | B60N 2/5635 165/202 |
| 8,359,871 | B2* | 1/2013 | Woods | F25B 21/02 62/3.2 |
| 10,427,567 | B2* | 10/2019 | Line | B60N 2/5642 |
| 10,493,879 | B2* | 12/2019 | Zimmann | B60N 2/7017 |
| 10,507,745 | B2* | 12/2019 | Dry | B60N 2/5657 |
| 10,571,161 | B2* | 2/2020 | Kim | F16K 31/002 |
| 2002/0145312 | A1* | 10/2002 | Gielda | B60N 2/5657 297/180.13 |
| 2004/0090093 | A1* | 5/2004 | Kamiya | B60N 2/5657 297/180.14 |
| 2006/0267260 | A1* | 11/2006 | Stowe | B60N 2/5685 267/143 |
| 2007/0035162 | A1* | 2/2007 | Bier | B60N 2/56 297/180.15 |
| 2008/0296939 | A1* | 12/2008 | Bajic | B60N 2/976 297/180.1 |
| 2015/0314716 | A1* | 11/2015 | Zimmann | B60N 2/5664 297/452.38 |
| 2016/0325655 | A1* | 11/2016 | Joshi | B60N 2/5657 |
| 2019/0061573 | A1* | 2/2019 | Dry | B60N 2/5635 |
| 2019/0160986 | A1* | 5/2019 | Tsai | B60H 1/241 |
| 2020/0376922 | A1* | 12/2020 | Bhandari | B60H 1/00285 |
| 2021/0039529 | A1* | 2/2021 | Bhandari | B60N 2/5657 |

* cited by examiner

FLEXIBLE HEAT EXCHANGER FOR THERMAL CONTROL OF SEATING SURFACES

FIELD OF THE INVENTION

The present invention is a method and apparatus related to the heating and thermal control of seating surfaces, for maintaining a climate-controlled ambiance for an occupant. These surfaces are such as a vehicle surface and these surfaces help to maintain the climate in the vehicle. More particularly, the invention relates to a flexible layer that is positioned underneath the surface of the seat and enables a heat transfer fluid to flow through it, thereby thermal control or heating the occupant.

BACKGROUND OF THE INVENTION

The thermal control of seating surfaces is beneficial for energy efficiency and occupant comfort, having been applied to various commercially successful products in the past. These include seats used in automobiles, offices and medical applications. Comfort benefits include rapid heat-up and cool-down time, a more even total body temperature for the occupant, and the reduction of perspiration that typically occurs between the occupant's skin and the portion of the body that is in contact with the seating surface, such as the lower back and legs. Energy efficiency is also improved because the occupant is heated or cooled directly without having to also heat or cool the surrounding room, vehicle cabin, or the like, thereby allowing for a smaller total thermal control system and also saving considerable energy.

Heated seats typically use an electrical resistance that is placed inside the seat cushion, at a certain depth away from the seating surface in order to avoid creating uneven pressure points once the occupant is seated. This means that the heat has to transfer through foam in order to reach the occupant, which requires a high heating wire temperature to overcome the insulating properties of the foam. These elevated temperatures often times necessitate the use of flame-retardant materials inside the foam cushion. The insulating properties of cushion materials, such as foam, also cause a time delay on the order of minutes before the occupant can begin to feel the warmth coming through the seat. In cold climates when the seat has been unoccupied for hours at a time, minimizing this delay is desirable.

Many cooled seats operate on the principle of forced-convection, meaning that air is forced through openings in the seat surface by a centrifugal air blower. This is a "single pass" flow system, where the air flows through the seat, past the occupant, and then into the ambient environment. For this to be effective, the air needs to constantly be flowing past the body of the occupant. While this is effective in pre-thermal control the seat surface before it is occupied, once someone sits down in the seat, their body obstructs many of the perforations in the seat surface that are used for delivering airflow. This reduces the amount of thermal control that is delivered, especially to the most critical parts of the body, which are directly in contact with the surface of the seat, where perspiration tends to form the most, soaking through clothing and causing discomfort. The blocking of the vents inside the seat also causes an increase in back-pressure of the air delivery channels, which changes the speed of the air delivery blower impeller. This increase in RPM causes a change in pitch of the sound of the blower, which can further create a noise, vibration and harshness issue inside the cabin.

Cooled seats that operate on the principle of forced-convection also have the disadvantage of requiring relatively high air pressures to operate. The small perforations inside the seating surface, as well as the channels required do deliver the air, often necessitate the use of high-pressure centrifugal air blowers, fans or pumps. In order to deliver an air volume sufficient for thermal control the occupant, the sound of these blowers is noticeable from inside the cabin of the vehicle. This is a problem, especially for luxury vehicles where the design target is to minimize interior noise, vibration and harshness.

Cooled seats that operate on the principle of flowing liquid through the seat in a closed-loop circuit have been described in prior art, but have not been widely successful commercially. Many describe fluid tubes that are placed within the foam cushion in order to avoid creating uneven pressure points at the surface of the seat, which would cause discomfort for the occupant. However, the insulating properties of the cushioning foam either limits the amount of thermal control that can be transferred through the seat, or this approach requires extremely cold fluid temperatures in order to overcome this insulation. Others describe coolant that flows through metal surfaces that the occupant sits on directly, but this typically creates pressure points that create discomfort during long periods of occupancy. Durability concerns also exist with this approach, due to the risk of unconventional use cases, such as child standing on the seat, or someone kneeling on the seat in order to reach something in the back of the vehicle. This causes localized pressure on the surface of the seat that would not be present in normal use, and could cause a permanent deformation of the thermal control plates or tubes, creating warranty risks for the automaker.

U.S. Pat. No. 7,152,412B2 relates to a "Personal back rest and seat thermal control and heating system". The invention discloses a fully adjustable personal back rest and seat thermal control and heating system specifically designed to provide several hours of high efficiency thermal control or heating when used by a user as either a seat cushion and back or a mattress or sleeping surface. This combination personal back rest and seat thermal control and heating system invention is capable of delivering several hours of high efficiency personal thermal control or heating without the use of caustic or toxic chemicals with virtually no risk of injury associated with its use. The main drawback of this invention is use of separate heating and thermal control system and bulky design.

CN102019865A relates to a "Heating and thermal control system for vehicle seat". The invention discloses a heating and thermal control apparatus for a vehicle seat, may include a blower blowing air into a duct leading to the vehicle seat, and a thermoelectric element assembly connected to the duct and including a thermoelectric element that heats or cools air introduced toward the vehicle seat from the duct, the thermoelectric element having condensed water passages penetrating from one side to the other side thereof to allow condensed water to flow there through. The main drawback of this invention is use of condensed water which reduces the life of system due to issue of thermal deposition.

Energy efficiency is becoming more critical in automobiles, especially those powered by batteries where the total available driving distance is limited by the capacity of the battery. Reducing the amount of energy consumed by auxiliary loads, such as the cabin air conditioning and heating systems, is critical to achieve a longer total driving range. In extremely cold or hot climates, the heating or thermal control of the vehicle cabin can reduce total available driving range by more than 30% depending on the use case. If it is possible to comfortably cool or heat the occupant directly through the seating surface, without having to also condition the temperature of the entire vehicle cabin, significant energy savings can be realized and the vehicle's total effective driving range can be increased.

Therefore, a need exists in the field for a way to heat or cool a seating surface in a manner that provides even cushioning support for the body while simultaneously avoiding blockage of the thermal control passages when the occupant sits down. A further need is for this heat exchange mechanism to have a short thermal pathway and good thermal contact with the occupant, so as to minimize warm-up and cool-down times and also maximize the rate of heat exchange with the occupant's body. Finally, there is a need for this system to be impervious to damage from localized pressure, such as from an occupant standing on the seating surface.

OBJECT OF THE INVENTION

The main object of the present invention is to provide a seat assembly with flexible heat exchanger for heating or cooling of the surface of a seat and prevent the blockage of fluid flow due to the pressure of an occupant's weight.

Another object of the present invention is to provide a heat exchanger sub-assembly having an upper layer, a lower layer, a plurality of fluid passages connected to plurality of fluid connection tubes and positioned below the seating surface and above the cushioning material provided with recesses into which these fluid passages rest, and prevent the blockage of fluid flow when the pressure from the weight of an occupant deforms the cushion.

Yet another object of the present invention is to provide a thermal control module for heating and cooling a seat assembly with flexible heat exchanger for usage in a vehicle utilizing the rear foot vent of the air conditioning system of the vehicle.

Yet another object of the present invention is to provide heat exchanger sub-assembly wherein the fluid passages are interconnected channels comprising of a plurality of rows and columns separated by openings and an intersection pathway of predefined shape.

Still another object of the present invention is to provide a seat assembly with flexible heat exchanger that facilitate a short thermal pathway and good thermal contact with the occupant, so as to minimize warm-up and cool-down times and also maximize the rate of heat exchange with the occupant's body.

SUMMARY OF THE INVENTION

The present invention comprises a seat assembly with flexible heat-exchanger for thermal control the surface of the seat that is designed to prevent the blockage of fluid flow due to the pressure of an occupant's weight, which generally consists of formed layers that create passages through which a heat exchange fluid flows. The upper surface seat cushioning material is formed such that there are recesses into which these fluid passages rest, thereby preventing the blockage of fluid flow when the pressure from the weight of an occupant deforms the cushion.

The present invention provides a seat assembly with flexible heat-exchanger for thermal control of a seat that is designed to prevent the blockage of fluid flow due to the pressure of an occupant's weight, comprising of one seating surface of said seat in direct contact with the occupant; one heat exchanger sub-assembly having an upper formed layer, a lower formed layer, fluid passages and plurality of fluid connection tubes positioned below the seating surface; a heat exchanger fluid to circulate in the fluid passages of the heat exchanger sub-assembly; at least one cushioning material underneath the heat exchanger sub-assembly; at least one thermal control module for heating or cooling of the heat exchanger fluid.

Therefore, the present invention provides a short thermal pathway and good thermal contact with the occupant, so as to minimize warm-up and cool-down times and also maximize the rate of heat exchange with the occupant's body.

BRIEF DESCRIPTION OF THE DRAWING

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

New seat heat-exchange devices and methods are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Figure 1:
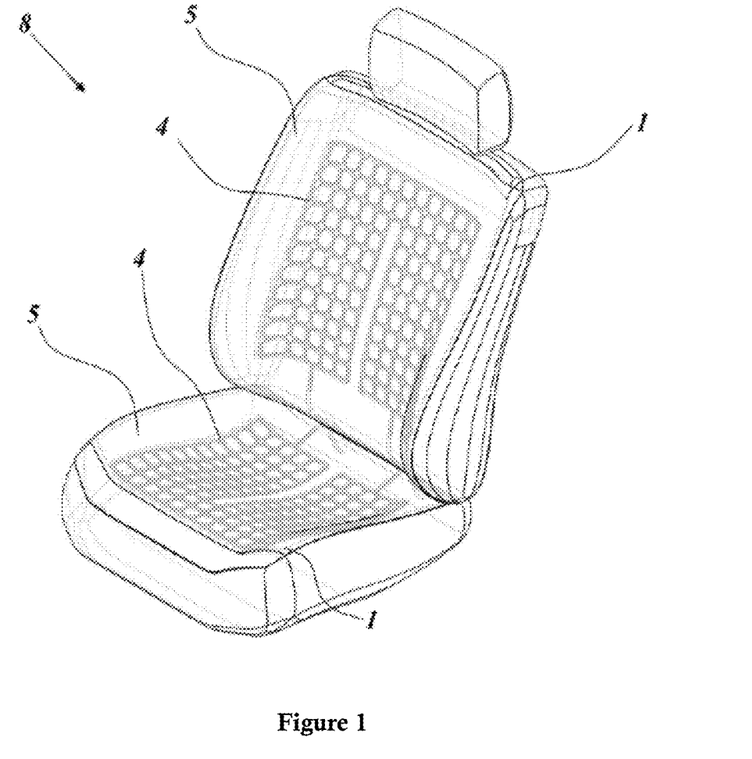
FIG. 1 depicts a perspective view of one example of a thermally controlled seat assembly according to various embodiments of the present invention.

The present invention will now be described by referencing the appended figures representing preferred embodiments. FIG. 1 depicts a perspective view of a complete thermally controlled seat assembly 8, featuring the heat-exchanger sub-assembly 1 positioned below the seating surface 5. The seating surface is made from material including but not limited to single pieces of cloth, leather, vinyl, or any commonly available upholstery material, or any combination of the foregoing. The seating surface 5 cover the upper and the lower portion of the seat. Either portion of the seat is covered either continuously or non-continuously with the seating surface 5. The seating surface 5 have an upper surface upon which the occupant is in direct contact with. The seating surface also has a lower surface that is opposite the first surface. The two surfaces define a constant thickness between them.

The upper and lower portions of the seat are possibly contoured. For example, the lower portions of the seat have a central region bound by a forward portion, a rear portion and two side bolsters. The upper portion of the seat has a central portion bound by an upper portion, a lower portion and two side bolsters. An intersection pathway separates the upper and the lower portions of the seat. The intersection is possibly joined so as to permit respective movement of the upper and the lower portion of the seat with respect to one another.

Figure 2:
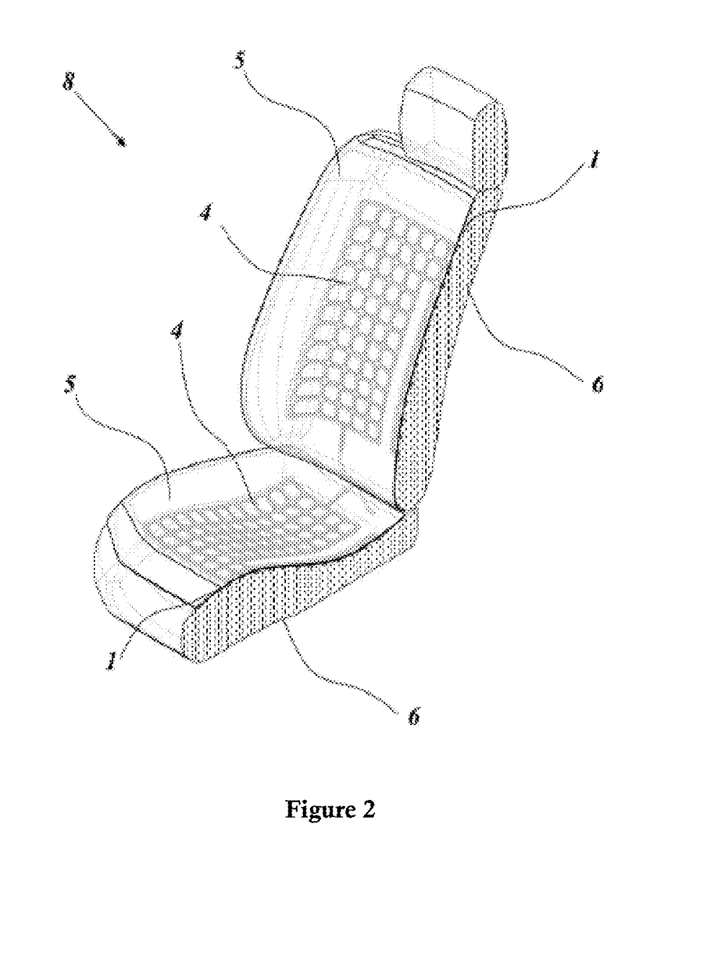
FIG. 2 illustrates a cut-away perspective view of one example of a thermally controlled seat assembly according to various embodiments of the present invention.

A first heat exchanger sub-assembly is located in the upper portion of the seat and a second heat exchanger sub-assembly is located in the lower portion of the seat, as shown in FIGS. 1 and 2.

The heat-exchanger sub-assembly 1 also comprises fluid passages 4, through which heat exchanger fluid such as water, water/glycol, brine, or any other commonly used heat exchange fluids passes. The sub-assemblies are in fluid communication with one another, and then both sub-assemblies as a single unit are connected to one or more fluid sources, or they are separately connected to one or more fluid sources.

The sub-assemblies comprise of a web of interconnected channels. While one pattern of the web is depicted in FIGS. 1 and 2, other embodiments are permissible. In a preferred embodiment for the sub-assemblies, the web comprise of interconnected channels in a series of rows and columns. Each row is in fluid communication with each column. Further, each row is in fluid communication with one another, and each column is in fluid communication with one another. The rows extend across the width of the upper and lower seat portions while the column extends the length of the upper and lower seat portions. The rows are transverse to the columns.

There is either equal number of rows as there are columns, or there is unequal number of rows as there are columns. In either case, it is preferable that the subassemblies span at least the central regions of the upper and lower seat portions.

Each row and column is separated from one another by openings. The openings are of equal size and shape or they are different from one another. Preferably, the openings are entirely free of material so as to be able to selectively receive seat cushioning material therein. In other words, the openings are like the female portion of a connection while the seat cushioning material is like the male portion of a connection. As shown in this embodiment, the openings are of shape including but not limited to polygons, such as hexagons, or oval. Or the openings are combinations of polygons and ovals. Preferably in all embodiments, the channels, regardless of their size or shape are all connected together with the opening interspersed between them.

Referring to FIG. 2, a cut-away view of the same angle as FIG. 1 reveals the cushioning material 6 that is underneath the heat exchange sub-assembly 1, which is in direct contact with the seating surface 5. The cushioning material is such as polyurethane foam, biodegradable foams, down, and other commonly used furniture materials. While certain materials for the cushioning material have been disclosed, the method and apparatus described herein are not limited to these materials.

Figure 3:
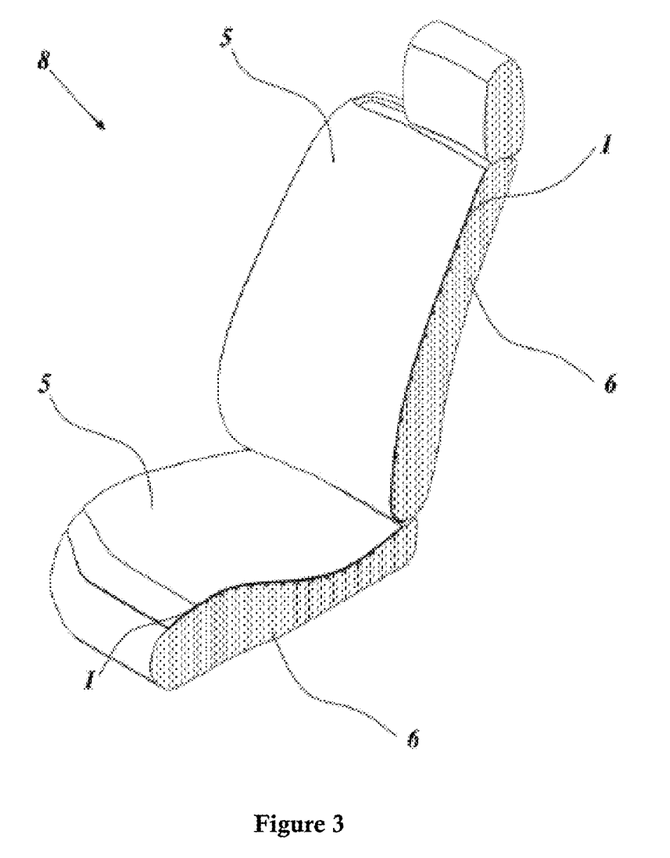
FIG. 3 illustrates another cut-away perspective view of one example of a thermally controlled seat assembly according to various embodiments of the present invention.

Referring to FIG. 3, a cut-away view of the same angle as FIG. 1 depicts the seating surface 5, which completely masks the heat-exchanger sub-assembly 1. Upon visual inspection of the exterior, the thermally controlled seat assembly 8 does not look any different from a normal seat to the naked eye.

Figure 4:
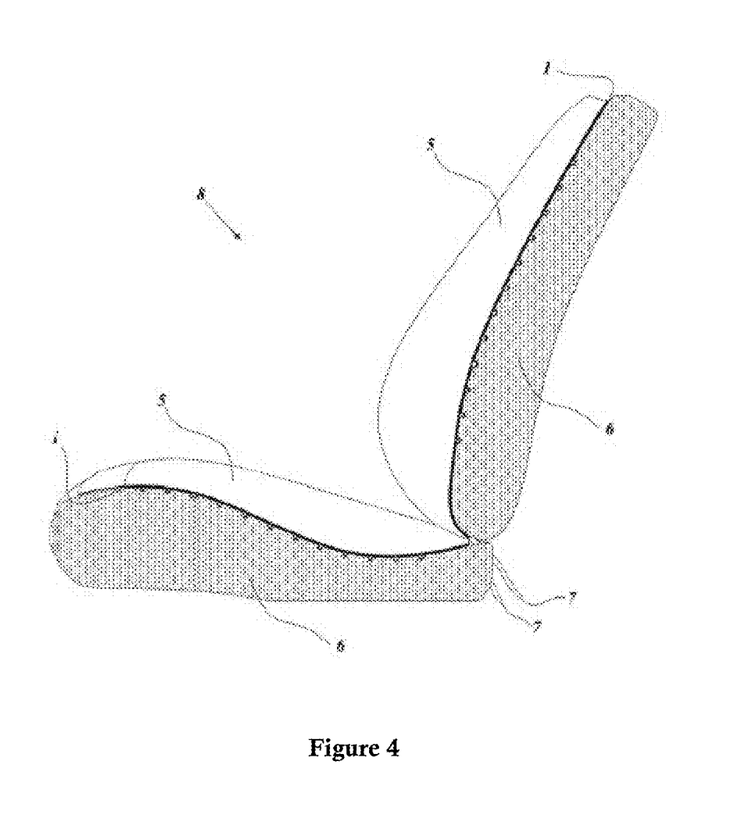
FIG. 4 illustrates a side cut-away view of one example of a thermally controlled seat assembly according to various embodiments of the present invention.

Referring to FIG. 4, a side-cut-away-view of the thermally controlled seat assembly 8 reveals the fluid connection tubes 7 which deliver and remove the closed-loop coolant from a thermal control module and flows through the seat heat exchanger sub assemblies 1, which are placed below the seating surfaces 5 on the cushion and backrest portions of the seat.

Figure 5:
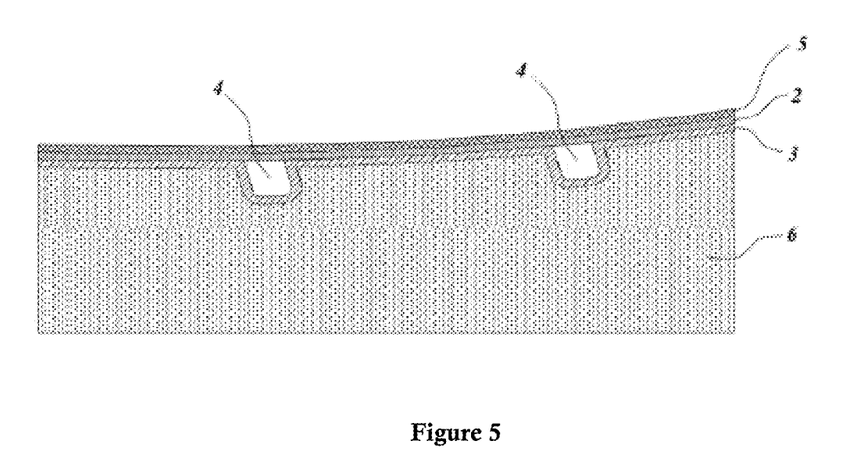
FIG. 5 illustrates a close-up side view, focusing on the heat exchange layer directly below the seating surface, of one example of a thermally controlled seat assembly according to various embodiments of the present invention.

Referring to FIG. 5, a close-up view of the area near the seating surface 5 shows the two layers of the heat exchanger sub-assembly, the upper layer 2 which is joined with the lower layer 3 to create sealed fluid passages 4, through which heat-exchange fluid circulates. The upper layer and lower layers possibly individually be continuous, unitary and one-piece. This is all placed above the seat cushioning material 6. The upper layer 2 and the lower layer 3 are made from polymer materials that include, but are not limited to, PVC (polyvinyl chloride), vinyl, PET (polyethylene terephthalate), PE (polyethylene), and PP (polypropylene). They are joined by methods that include, but are not limited to, heat-sealing, ultrasonic welding, or chemical adhesives. Upper layer 2 is either bonded or not bonded to seating surface 5, and lower layer 3 is either bonded or not bonded to the cushioning material 6. The forming of upper layer 2 and lower layer 3 is accomplished with methods that include, but are not limited to, vacuum-forming, thermo-forming, blow-molding and injection-molding.

The preferred embodiment of the invention has upper layer 2 and lower layer 3 made from PVC material that is between 0.1 and 1.0 mm thick, which are heat-sealed to one another, creating fluid passages 4 that have a cross-sectional area of between 1 mm$^2$ to 75 mm$^2$ This is placed on top of a foam cushioning material 6, which is pre-formed with passages that match the same pattern as lower layer 3.

The cushioning material is provided with a three dimensional pattern that matches the patterns of the subassemblies. As can be appreciated in FIG. 5, the cushioning material is provided with a series of lands and channels. The channels receive the troughs of the lower layer, while the lands receive the bottom surface of the lower layer. Preferably, the channels in the cushioning material have a complimentary shape to the troughs so that the troughs are not compressed within the channels. Further, the channels are not so wide so that the troughs have movement and result in undesirable wear on the channels or cushioning material. As shown in FIG. 5, the channels have a lower wall transverse to two parallel side walls. The lower channel wall is in direct facing contact with the bottom portion of the trough and the side walls are in direct facing contact with their respective side portions.

Lands of cushioning material extend continuously between each trough. The lands support the lower formed layer, which in turn support the upper formed layer.

The above described arrangement ensures that even if an occupant sits on the seat, the fluid passages 4 do not get blocked due to the pressure of the weight, and continue circulating the heat-exchange fluid through the seat. This is because the upper ridged portions of the foam cushioning material 6 support the weight of the occupant, and limit the deformation of this upper layer which would eventually block the fluid passages 4.

Figure 6:
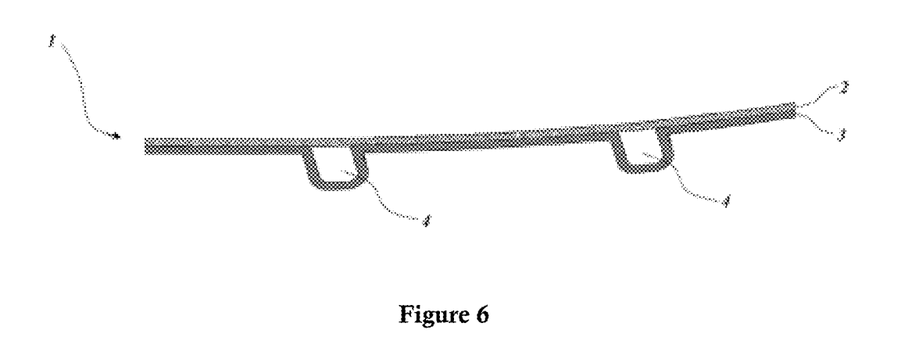
FIG. 6 illustrates a close-up side view of the seat heat exchanger sub-assembly, according to various embodiments of the present invention.

Referring to FIG. 6, a close-up view of the heat exchanger sub-assembly 1 depicts the upper layer 2 which is joined with the lower layer 3 to create sealed fluid passages 4, through which heat-exchange fluid circulates.

The upper layer 2 resides entirely above the seat cushioning material 6. The upper layer 2 has an upper surface and a lower surface. The two thicknesses define a constant thickness between them. The upper layer 2 is primarily planar in that it does not have any crests, troughs or other deviations.

The lower layer 3 is comprised of planar portions separated by troughs. The troughs extend below the planar portions of the lower layer. The troughs have a bottom portion and two side portions. The side portions are transverse to the bottom portion and they are parallel to one another. The tops of the troughs are covered by the upper layer 2. Preferably, the tops of the troughs are sealed by the upper layer 2.

The materials of the upper layer 2 and lower layer 3 are impervious to fluid. Thus, fluid is permitted to flow within the channels as noted above but it cannot flow through the layer materials.

Figure 7:
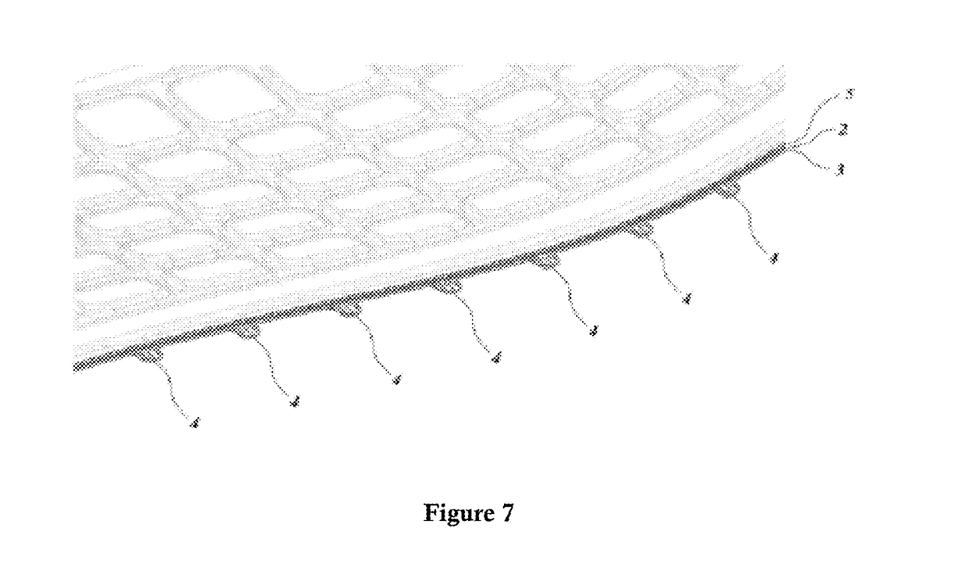
FIG. 7 illustrates a close-up perspective view of the seat heat exchanger sub-assembly, according to various embodiments of the present invention.

Referring to FIG. 7, a perspective view of the heat exchanger sub-assembly depicts the upper layer 2 which is joined with the lower layer 3 to create sealed fluid passages 4, through which heat-exchange fluid circulates. This is placed directly below the seating surface 5, in order to create the shortest thermal path to reaching the occupant's body. The fluid passages 4 are connected to a thermal control module via fluid connection tubes 7 to provide a coolant for circulation. The thermal control module for a vehicle is preferably an AC vent system of the vehicle.

Figure 8:
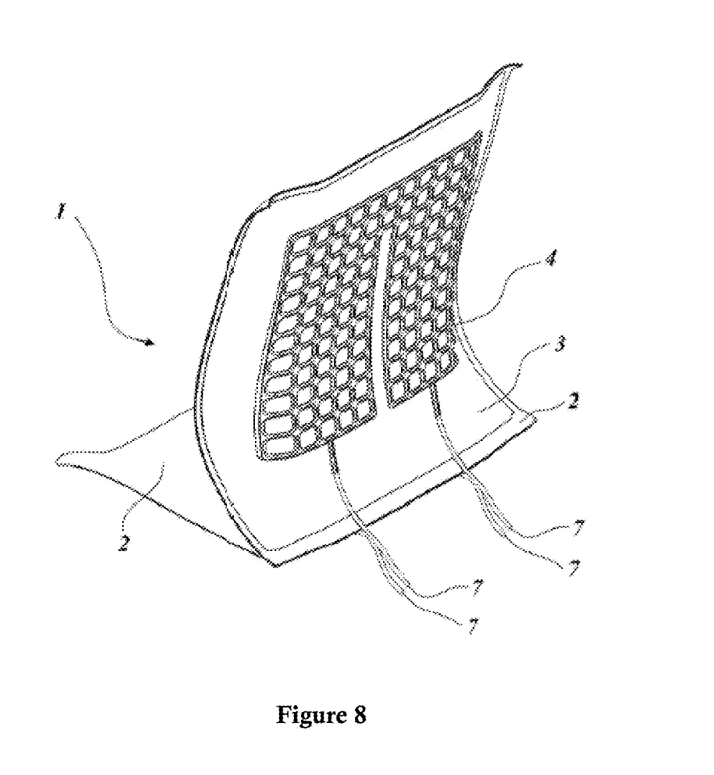
FIG. 8 illustrates a perspective view of the seat heat exchanger sub-assembly, according to various embodiments of the present invention.

Referring to FIG. 8, a perspective view of the heat exchanger sub-assembly 1 depicts the upper layer 2 which is joined with the lower layer 3 to create sealed fluid passages 4, through which heat-exchange fluid circulates. Fluid connection tubes 7 are connected to fluid passages 4 for the delivery and removal of the heat transfer fluid. These fluid connection tubes 7 are connected to the fluid passages 4 via methods that can include adhesive or solvent bonding, or via an intermediary polymer component that is heat-sealed or vibration bonded to the layers 2 and 3, with an opening to passages 4. These tubes are connected at the back of the seat, or extend downward through the cushion, to be connected to a manifold underneath the cushion region. The direction of circulation of the fluid matters less than the overall flow-rate, which needs to be high enough to prevent a temperature difference of more than 5 degrees centigrade between the inlet and outlet. If the circulation rate of the fluid is too slow, then thermal gradients arise within the thermal control layer between the inlet and outlet that are noticeable by the occupant, due to uneven surface temperatures and therefore uneven thermal control.

The entire heat exchanger sub-assembly 1 is flexible, and notwithstanding the depth of the fluid passages 4, is less than 1 mm thick in its preferred embodiment, in the regions where the two layers i.e. upper layer 2 and lower layer 3 are heat-sealed together. This makes it flexible, stretchable, durable, and nearly unnoticeable to the occupant when seated, relative to a conventional seating surface. This flexibility allows it to be placed directly underneath the seating surface material 5, without the need of further cushioning in order to provide even support to the occupant, a layer that would also thermally insulate the heat exchanger from the occupant. The thin material also allows for high rates of heat transfer to the occupant, enabling high rates of thermal control or heating, and low delays in warm-up and cool-down time.

Figure 9:
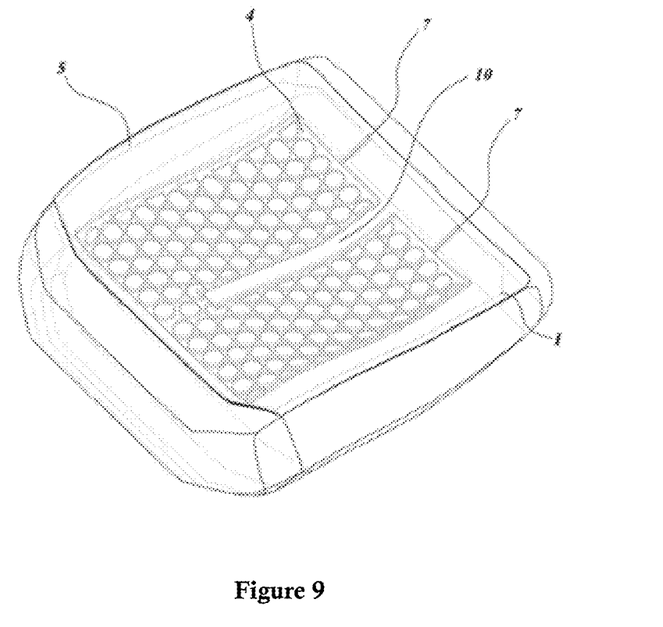
FIG. 9 illustrates a perspective view of another embodiment of a seat heat exchanger, according to various embodiments of the present invention.

Referring to FIG. 9, a different preferred embodiment is shown, where the shape of the support structure inside of the foam is different. There are plurality of columns and rows that define an empty area. Further, the shape of openings comprises of circles, which are full circles or partial circles. The cushioning material has a complimentary shape to the openings such that it fits in the openings as described above. Flow pathway 4 is recessed, allowing fluid to flow around the circular supports which hold the weight of the occupant and prevent the fluid pathways from collapsing and blocking the flow. Fluid pathway guide 10 is common in all designs, but need not take this exact shape. Its purpose is to guide the flow from fluid connection tubes 7 around the entire area of the seat, preventing a "short circuiting" of fluid flow that would otherwise occur close to the fluid exit and inlet. The direction of flow from the connection tubes 7 is not important; it can flow either way with no impact on performance.

Figure 10:
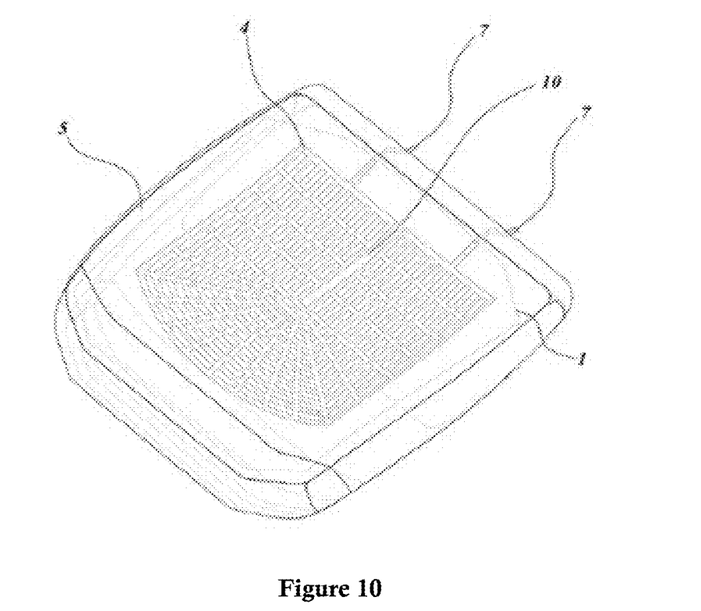
FIG. 10 illustrates a perspective view of another embodiment of a seat heat exchanger, according to various embodiments of the present invention.

Referring to FIG. 10, another preferred embodiment is shown, with yet a different fluid pathway pattern. The exact shape of the supports that allow the recessed fluid pathway 4 to flow coolant again does not matter, as long as it has multiple points of flow intersection, where a single blockage of flow, stemming from a collapse of the fluid flow pathway due to acute pressure from the occupant's weight will not completely block the flowpath; rather, it will naturally flow around the blockage due to the multiple intersection points where flow can branch out and then re-connect. This creates a web of fluid communications pathways, ensuring multiple redundancy of available flow pathways, greatly reducing the chances of total flow blockage.

Overall, the preferred embodiment includes a flexible cushion support with a plurality of channels extending in one direction and a plurality of connecting channels extending in a second direction transverse to the first, thereby forming a web of interconnected fluid passages which allow for the flow to take multiple directions around any sort of blockage caused by occupant pressure. These channels also have at least one flow-guide that directs the overall fluid flow from the inlet to the outlet, preventing a short-circuiting of flow that would otherwise go directly from the inlet to the outlet, bypassing the other passages. Above this flexible cushion support layer there are pluralities of polymer sheets that are joined to one another, and are formed in such a way that the pattern of the passageways matches that of the flexible cushion into which it is inlaid. This sub-assembly of polymer sheets is removable from the foam cushion and lies below the final seating surface material.

In one embodiment, at least the lowermost surfaces of the lower layer are connected to the cushion material. By connecting the lower layer to the cushion material, relative movement between the lower layer and the cushion is prevented or reduced. The connection includes such as by adhesive, bonding, welding or mechanical connection.

Figure 11A:
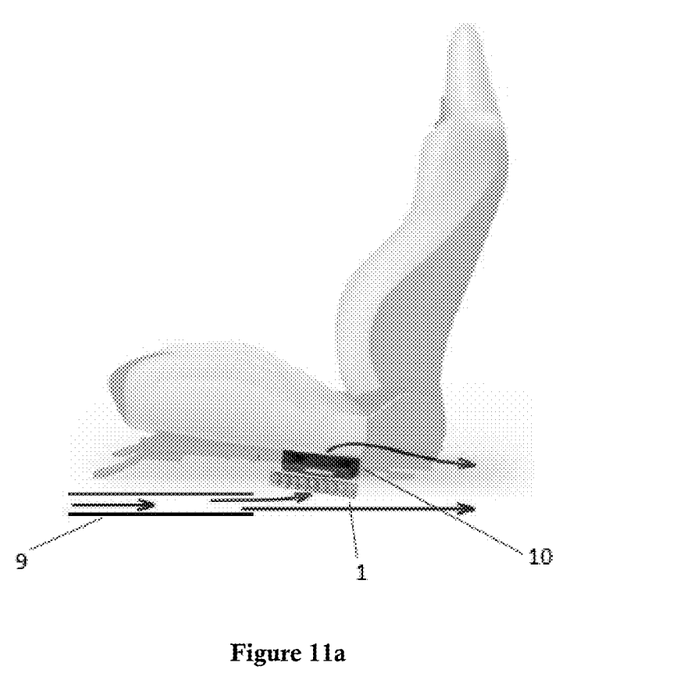
FIG. 11a illustrates the thermal control module connected to fluid passages of heat exchanger sub-assembly, according to an embodiment of the present invention.
Figure 11B:
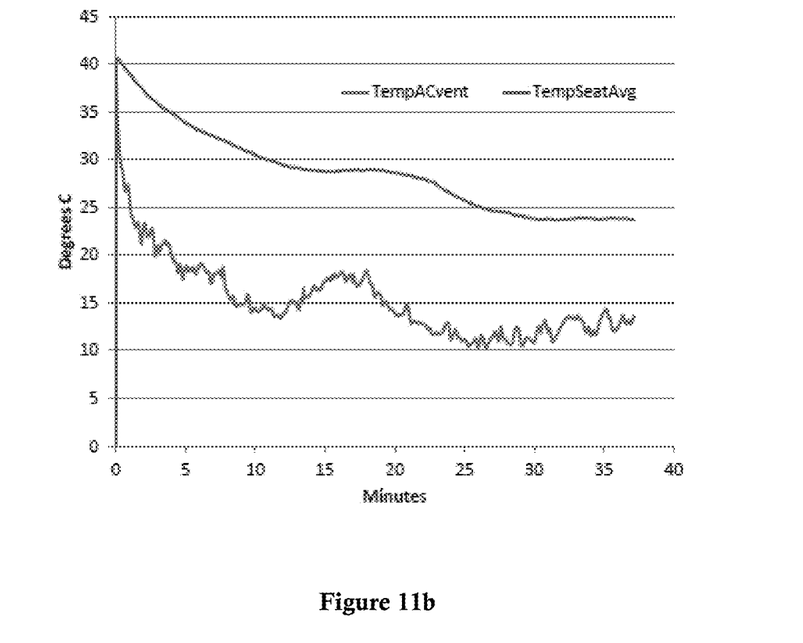
FIG. 11b shows a time v/s temperature plot of a AC vent system as a thermal control module, according to an embodiment of the present invention.

Referring to FIG. 11*a* in an embodiment, the thermal control module connected to fluid connection tubes 7 of heat exchanger sub-assembly 1 in a vehicle is an AC vent system comprising of a radiator, a pump, a low speed fan in connection with a rear foot AC vent of the air conditioner of the vehicle for thermal control of the fluid. The fluid gets cooled from the ac vent and circulates through the pump it in the seat while the air conditioner is in refrigeration cycle. For heating the air conditioner is put into heating mode and the refrigeration cycle gets reversed and starts heating the fluid. The radiator used is preferably an aluminium radiator with 120 mm×120 mm dimension. The low speed fan used is preferably a 120 mm fan. The pump used is a mini centrifugal pump with a flow rate of 3 LPM. The AC vent system as thermal control module for vehicles provide a temperature difference of 9-10 degree Celsius between the temperature of air from AC vent and temperature of the seating surface as shown in the time v/s temperature plot of a AC vent system as a thermal control module given in FIG. 11*b*. The plot also depicts that within 5 minutes the seat starts thermal control down, and in less than 10 minutes the seat surface temperature becomes quite cold.

Therefore, the present invention provides a heat exchange mechanism to have a short thermal pathway and good thermal contact with the occupant, so as to minimize warm-up and cool-down times and also maximize the rate of heat exchange with the occupant's body. Further, the present invention is resistant to damage from localized pressure, such as from an occupant standing on the seating surface.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

We claim:

1. A seat assembly (8) with a flexible heat-exchanger comprising:
    at least one seating surface (5) of said seat in direct contact with an occupant;
    at least one heat exchanger sub-assembly (1) having an upper layer (2), a lower layer (3), a plurality of fluid passages (4) and a plurality of fluid connection tubes (7), and said assembly is positioned below the seating surface (5);
    a heat exchange fluid circulating in the fluid passages (4) of the heat exchanger sub-assembly;
    at least one cushioning material (6) underneath the heat exchanger sub-assembly (1);
    at least one thermal control module for heating or cooling of the heat exchanger fluid;
    wherein,
    said seat assembly (8) is for thermal control of a seat;
    said upper layer (2) and lower layer (3) are sealed together to create fluid passages (4);
    the fluid passages (4) are interconnected channels comprising of a plurality of rows and columns separated by openings and an intersection pathway of predefined shape; and
    the cushioning material (6) has a recessed pattern to conform with the fluid passages (4) and to prevent blockage in circulation of heat exchanger fluid due to occupant's weight.

2. The seat assembly (8) as claimed in claim 1, wherein the heat exchange fluid includes but is not limited to water, water/glycol, brine or any industrial coolant.

3. The seat assembly (8) as claimed in claim 1, wherein the upper layer (2) and lower layer (3) is of thickness in range of 0.1 and 1.0 mm and sealed together, creating fluid passages (4) that have a cross-sectional area in the range of 1 mm$^2$ to 75 mm$^2$.

4. The seat assembly (8) as claimed in claim 1, wherein the upper layer (2) and lower layer (3) is made of polymer materials that include, but are not limited to PVC (polyvinyl chloride), vinyl, PET (polyethylene terephthalate), PE (polyethylene), and PP (polypropylene) and sealed together by methods that include, but are not limited to, heat-sealing, ultrasonic welding, or chemical adhesives.

5. The seat assembly (8) as claimed in claim 1, wherein the upper layer (2) is either or not be bonded to seating surface (5), and lower layer (3) is either or not be bonded to the cushioning material (6).

6. The seat assembly (8) as claimed in claim 1, wherein the upper layer (2) and lower layers (3) are manufactured by a method including, but are not limited to, vacuum-forming, thermoforming, blow-molding and injection-molding.

7. The seat assembly (8) as claimed in claim 1, wherein the fluid passages (4) are connected to the thermal control module via fluid connection tubes (7) via methods including but not limited to adhesive or solvent bonding, or via an intermediary polymer component being heat-sealed or vibration bonded to the upper layers (2) and lower layer (3).

8. The seat assembly (8) as claimed in claim 1, wherein the predefined shape of openings include but not limited to circles, full circles or partial circles.

9. The seat assembly (8) as claimed in claim 1, wherein the thermal control module connected to fluid connection tubes (7) of seat sub-assembly (8) in a vehicle is an AC vent system comprising of a radiator, a pump, a low speed fan (10) in connection with a rear foot AC vent (9) of an air conditioner of the vehicle for cooling of the fluid.

10. The seat assembly (8) as claimed in claim 9, wherein the AC vent system provides a temperature difference of 9-10 degree Celsius between temperature of air from air conditioner of the vehicle and temperature of the seating surface (5).

* * * * *